United States Patent
Nakajima et al.

(10) Patent No.: US 12,534,882 B2
(45) Date of Patent: Jan. 27, 2026

(54) HYDRAULIC CIRCUIT FOR A CONSTRUCTION MACHINE

(71) Applicant: Caterpillar SARL, Geneva (CH)

(72) Inventors: Hideki Nakajima, Akashi (JP); Koichi Kiyasu, Akashi (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 19/098,038

(22) Filed: Apr. 2, 2025

(65) Prior Publication Data

US 2025/0305246 A1    Oct. 2, 2025

(30) Foreign Application Priority Data

Apr. 2, 2024   (JP) .................. 2024-059515

(51) Int. Cl.
| | |
|---|---|
| *E02F 9/22* | (2006.01) |
| *F15B 11/17* | (2006.01) |
| *F16H 61/4078* | (2010.01) |
| *F16H 61/4148* | (2010.01) |

(52) U.S. Cl.
CPC .......... *E02F 9/2296* (2013.01); *E02F 9/2242* (2013.01); *E02F 9/2285* (2013.01);
(Continued)

(58) Field of Classification Search
CPC ....... F15B 11/161; F15B 11/165; F15B 11/17; F16H 61/4078; F16H 61/4148;
(Continued)

(56) References Cited

U.S. PATENT DOCUMENTS

| | | | | |
|---|---|---|---|---|
| 3,396,536 A | * | 8/1968 | Miller ................. | F16H 61/433 91/506 |
| 4,033,127 A | * | 7/1977 | Amstutz ............... | F16H 39/02 60/486 |

(Continued)

FOREIGN PATENT DOCUMENTS

| | | | | |
|---|---|---|---|---|
| JP | 2870187 B2 | * | 3/1999 | ......... F16H 61/4078 |
| JP | 2001173025 A | | 6/2001 | |

(Continued)

*Primary Examiner* — Michael Leslie

(57) ABSTRACT

Problem to be solved: To provide a hydraulic circuit for a construction machine capable of supplying hydraulic oil to a closed circuit without a charge pump. Means for solving the problem: The open circuit of the hydraulic circuit includes a hydraulic pump, a hydraulic actuator operated by hydraulic oil discharged from the hydraulic pump, a directional switching valve for switching a flow direction of the hydraulic oil from the hydraulic pump to the hydraulic actuator, a return line connecting the directional switching valve and a hydraulic oil tank, and a return check valve provided in the return line. The closed circuit of the hydraulic circuit includes a bidirectional hydraulic pump having a first port and a second port, a hydraulic motor operated by hydraulic oil discharged from the bidirectional hydraulic pump, a first line connecting the first port of the bidirectional hydraulic pump and the hydraulic motor, and a second line connecting the second port of the bidirectional hydraulic pump and the hydraulic motor. Between the open circuit and the closed circuit, a charge line connecting the return line and the first line via a first check valve and connecting the return line and the second line via a second check valve is provided.

10 Claims, 5 Drawing Sheets

(52) U.S. Cl.
CPC .......... *E02F 9/2289* (2013.01); *E02F 9/2292* (2013.01); *F15B 11/17* (2013.01); *F16H 61/4078* (2013.01); *F16H 61/4148* (2013.01)

(58) Field of Classification Search
CPC ..... E02F 9/2217; E02F 9/2239; E02F 9/2242; E02F 9/2253; E02F 9/2289; E02F 9/2292; E02F 9/2296
See application file for complete search history.

(56) References Cited

U.S. PATENT DOCUMENTS

| | | | | |
|---|---|---|---|---|
| 5,069,037 | A * | 12/1991 | Sakigawa | B60K 17/28 60/494 |
| 5,072,584 | A * | 12/1991 | Mauch | F15B 21/041 91/437 |
| 6,675,576 | B2 * | 1/2004 | Bigo | F16H 61/4043 60/494 |
| 9,458,842 | B2 * | 10/2016 | Berg | F04B 17/05 |
| 10,119,556 | B2 * | 11/2018 | Peterson | E02F 9/2217 |
| 10,215,199 | B2 * | 2/2019 | Cosoli | F15B 1/04 |
| 10,900,199 | B2 * | 1/2021 | Kondo | E02F 9/123 |
| 11,384,511 | B2 * | 7/2022 | Oouchi | F16H 61/4148 |
| 2022/0154738 | A1 * | 5/2022 | Nakashima | E02F 9/22 |

FOREIGN PATENT DOCUMENTS

| | | |
|---|---|---|
| JP | 2004332850 A | 11/2004 |
| JP | 2006336673 A | 12/2006 |
| JP | 2015206415 A | 11/2015 |
| JP | 2015209943 A | 11/2015 |

\* cited by examiner

HYDRAULIC CIRCUIT FOR A CONSTRUCTION MACHINE

CROSS-REFERENCE TO RELATED APPLICATION

This application claims priority under 35 USC § 119 and the Paris Convention to Japanese Patent Application 2024-059515 filed on Apr. 2, 2024.

TECHNICAL FIELD

The present invention relates to a hydraulic circuit for a construction machine having an open circuit and a closed circuit.

BACKGROUND

In a hydraulic circuit of a hydraulic excavator or a wheel loader, a closed circuit closed by a bidirectional hydraulic pump and a hydraulic actuator may be employed. In the closed circuit, a charge pump for supplying the hydraulic oil to the closed circuit is usually provided for replenishing the insufficient oil amount when the hydraulic actuator is stopped or cooling the hydraulic oil in the closed circuit (see, for example, Patent Document 1).

PRIOR ART DOCUMENTS

Patent Document

Patent Document 1: JP 2001173025 A.

SUMMARY OF THE INVENTION

Problems to be Solved by the Invention

When the closed circuit is adopted, problems such as an increase in the cost of the hydraulic circuit and a waste of energy may occur. In general, when a charge pump is provided, it is recommended to use an external filter in combination, so that not only the cost of the charge pump but also the cost of the external filter is included in the cost of the entire hydraulic circuit. In addition, since the charge pump is driven by a drive source such as an engine and is always driven while the drive source is in operation even when the charge of hydraulic oil to the closed circuit is not required, there is a wasteful drive time of the charge pump, and thus energy is wasted.

An object of the present invention is to provide a hydraulic circuit for a construction machine capable of supplying hydraulic oil to a closed circuit without a charge pump.

Means for Solving the Problem

According to the present invention, a hydraulic circuit for a construction machine is provided to solve the above problem. That is to say, it provides a hydraulic circuit for a construction machine including an open circuit and a closed circuit, wherein the open circuit includes:
a variable-volume hydraulic pump configured to discharge hydraulic oil sucked from a hydraulic oil tank;
a hydraulic actuator operated by the hydraulic oil discharged from the hydraulic pump;
a directional switching valve configured to switch a flow direction of the hydraulic oil from the hydraulic pump to the hydraulic actuator;
a pump line connecting the hydraulic pump and the directional switching valve;
a return line connecting the directional switching valve and the hydraulic oil tank;
a return check valve provided in the return line;
a bypass line connecting the pump line and the return line;
an electromagnetic proportional bypass valve provided in the bypass line,
wherein the closed circuit includes:
a variable-volume bidirectional hydraulic pump having a first port and a second port;
a hydraulic motor operated by hydraulic oil discharged from the bidirectional hydraulic pump;
a first line connecting the first port of the bidirectional hydraulic pump and the hydraulic motor;
a second line connecting the second port of the bidirectional hydraulic pump and the hydraulic motor, and
wherein a charge line is provided between the open circuit and the closed circuit that connects a portion of the return line on an upstream side of the return check valve to the first line via a first check valve, and connects a portion of the return line on an upstream side of the return check valve to the second line via a second check valve.

The closed circuit may include a first relief valve that releases hydraulic oil in the first line to the second line via the second check valve, and a second relief valve that releases hydraulic oil in the second line to the first line via the first check valve.

Preferably, a throttle is disposed between the first relief valve and the second check valve and between the second relief valve and the first check valve, and a third relief valve is disposed between the first relief valve and the hydraulic oil tank and between the second relief valve and the hydraulic oil tank, wherein a set pressure of the third relief valve is smaller than a set pressure of the first relief valve and smaller than a set pressure of the second relief valve.

The closed circuit may include a first relief valve that releases hydraulic oil in the first line to the hydraulic oil tank and a second relief valve that releases hydraulic oil in the second line to the hydraulic oil tank.

The first check valve and the second check valve may be mounted on a housing of the bidirectional hydraulic pump, and the charge line may be connected to the housing. Alternatively, the first check valve and the second check valve may be mounted on a housing of the hydraulic motor, and the charge line may be connected to the housing.

Preferably, the hydraulic circuit of the present invention includes a pressure sensor that detects a pressure on the upstream side of the return check valve in the return line, and a controller that increases a discharge amount of the hydraulic pump when the pressure detected by the pressure sensor is lower than a required pressure.

Preferably, the controller sets the required pressure based on an operation amount of a motor manipulator that outputs a signal for operating the hydraulic motor of the closed circuit. The controller may set the required pressure based on a rotation speed of an operation target operated by the hydraulic motor of the closed circuit.

The hydraulic circuit of the present invention may include a regulator that controls a discharge amount and a discharge direction of the bidirectional hydraulic pump, an electromagnetic proportional regulator switching valve that switches a flow direction of pilot hydraulic oil to the regulator, a pilot line branching from the pump line and extending to the regulator switching valve, and a pressure reducing valve provided in the pilot line.

In the hydraulic circuit of the present invention, since a charge line is provided between the open circuit and the closed circuit that connects a portion of the return line on the upstream side of the return check valve and the first line via a first check valve, and connects a portion of the return line on the upstream side of the return check valve and the second line via a second check valve, hydraulic oil can be supplied to the closed circuit without a charge pump.

BRIEF DESCRIPTION OF DRAWINGS 1 is a circuit diagram of a hydraulic circuit for a construction machine according to the first embodiment of the present invention.

DETAILED DESCRIPTION OF THE INVENTION

The First Embodiment

Now, the first embodiment of a hydraulic circuit for a construction machine according to the present invention will be described with reference to the drawings above.

Industrial Applicability

Hydraulic Circuit 2, Open Circuit 2a

Figure 1:
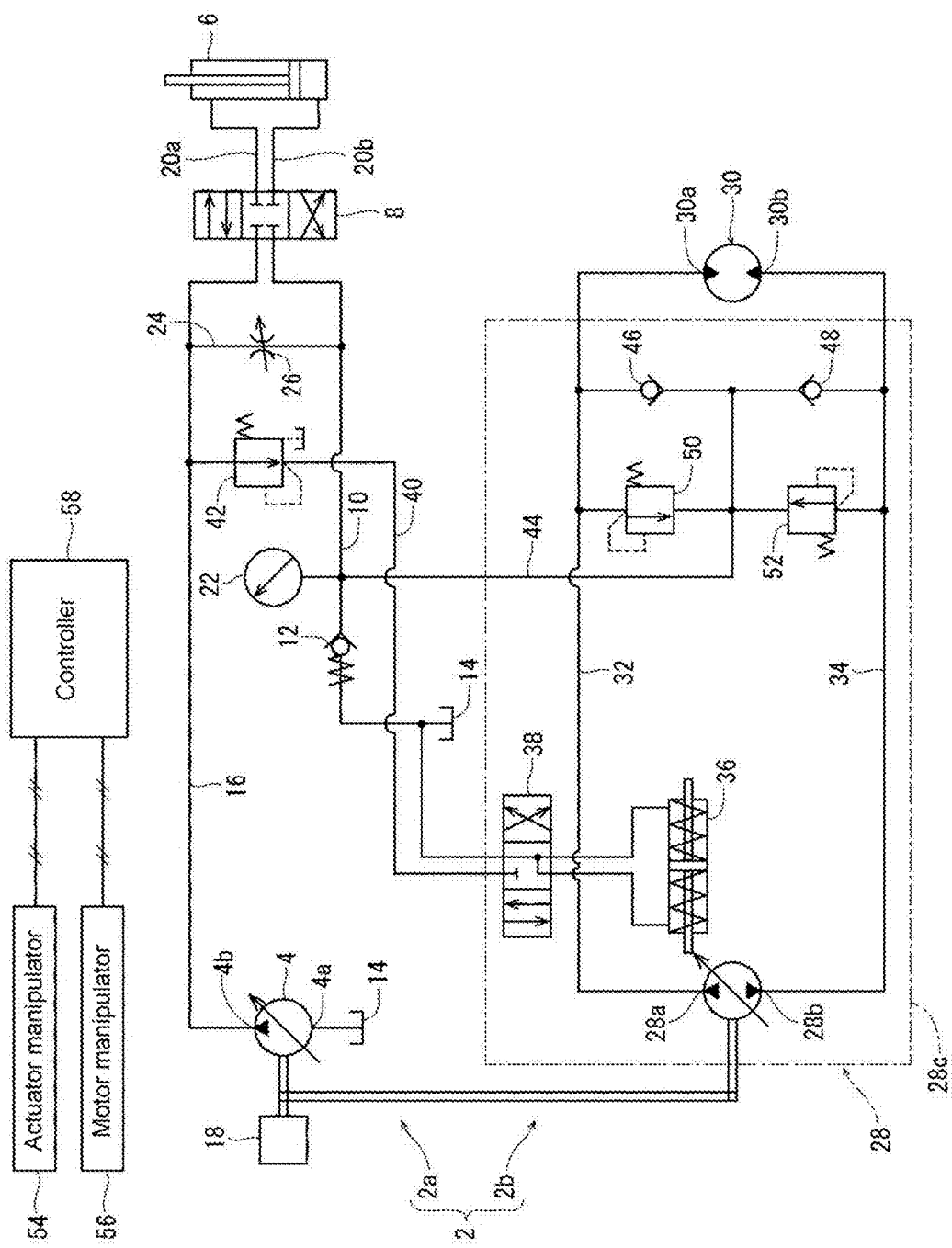

FIG. 1 shows a hydraulic circuit 2 according to the first embodiment. The hydraulic circuit 2 includes an open circuit 2a and a closed circuit 2b. The open circuit 2a includes a hydraulic pump 4, a hydraulic actuator 6, a directional switching valve 8, a return line 10, and a return check valve 12.

Hydraulic Pump 4

The hydraulic pump 4 has a suction port 4a and a discharge port 4b, sucking the hydraulic oil in a hydraulic oil tank 14 from the suction port 4a, and discharging the hydraulic oil from the discharge port 4b to a pump line 16. The hydraulic pump 4 is driven by a drive source 10, such as an engine or an electric motor, and is configured to continuously discharge the hydraulic oil from the hydraulic oil tank 14 to the pump line 16 when the drive source operates. However, the hydraulic pump 4 is of a variable-volume type, and the amount of the hydraulic oil discharged to the pump line 16 can be appropriately changed depending on the operating conditions of the construction machine on which the hydraulic circuit 2 is mounted.

Hydraulic Actuator 6

The hydraulic actuator 6 is operated by the hydraulic oil discharged from the hydraulic pump 4. Although FIG. 1 shows a hydraulic cylinder as the hydraulic actuator 6, the hydraulic actuator 6 may be a hydraulic motor. Further, the number of hydraulic actuators 6 is arbitrary. For example, a plurality of hydraulic cylinders and a plurality of hydraulic motors may be included as the hydraulic actuator 6 of the open circuit 2a.

Directional Switching Valve 8

The directional switching valve 8 switches a flow direction of the hydraulic oil from the hydraulic pump 4 to the hydraulic actuator 6. The directional switching valve 8 is connected to the hydraulic pump 4 via the pump line 16 and is connected to the hydraulic oil tank 14 via the return line 10. Further, the directional switching valve 8 is connected to the hydraulic actuator 6 via a pair of lines 20a and 20b. The directional switching valve 8 may be of an electromagnetic proportional type or a hydraulic pilot type. In addition, a plurality of directional switching valves 8 may be provided corresponding to the number of hydraulic actuators 6.

When the directional switching valve 8 is opened, the pump line 16 communicates with either one of the pair of lines 20a, 20b, and the other of the pair of lines 20a, 20b communicates with the return line 10. As a result, the hydraulic actuator 6 is operated. Further, when the directional switching valve 8 is closed, the communication between the pump line 16 and the return line 10 and the pair of lines 20a and 20b is blocked, and the operation of the hydraulic actuator 6 is stopped.

Return Line 10, Return Check Valve 12

The return line 10 is a line connecting the directional switching valve 8 and the hydraulic oil tank 14. The return check valve 12 provided in the return line 10 generates a back pressure in the return line 10. The back pressure generated by the return check valve 12 increases as the amount of the hydraulic oil passing through the return line 10 increases. In addition, the return line 10 is provided with a pressure sensor 22 that detects a pressure on the upstream side of the return check valve 12 in the return line 10.

Bypass Line 24, Bypass Valve 26

The open circuit 2a is provided with a bypass line 24 connecting the pump line 16 and the return line 10. The bypass line 24 is provides with an electromagnetic proportional bypass valve 26 for adjusting the amount of hydraulic oil flowing from the pump line 16 to the return line 10.

Closed Circuit 2b

The closed circuit 2b includes a bidirectional hydraulic pump 28, a hydraulic motor 30, a first line 32, and a second line 34.

Bidirectional Hydraulic Pump 28

The bidirectional hydraulic pump 28 has a first port 28a and a second port 28b, and sucks the hydraulic oil from the first port 28a and discharges the hydraulic oil from the second port 28b, or sucks the hydraulic oil from the second port 28b and discharges the hydraulic oil from the first port 28a. That is, in the bidirectional hydraulic pump 28, in contrast to the case where the first port 28a becomes a suction port and the second port 28b becomes a discharge port, there is a case where the second port 28b becomes a suction port and the first port 28a becomes a discharge port. Note, since the closed circuit 2b is a circuit closed by the bidirectional hydraulic pump 28 and the hydraulic motor 30, the bidirectional hydraulic pump 28 does not suck and discharge the hydraulic oil in the hydraulic oil tank 14, unlike the hydraulic pump 4 of the open circuit 2a.

The bidirectional hydraulic pump 28 is driven by the drive source 18 similarly to the hydraulic pump 4 of the open circuit 2a. Therefore, the bidirectional hydraulic pump 28 is always rotated while the drive source 18 is in operation. However, since the bidirectional hydraulic pump 28 is of a variable-volume type, and the discharge amount and discharge direction are controlled by the regulator 36, the hydraulic oil may not be discharged from either the first port 28a or the second port 28b even when the bidirectional hydraulic pump 28 is rotating.

The regulator 36 of the bidirectional hydraulic pump 28 is a hydraulic pilot type, and a flow direction of the hydraulic oil with respect to the regulator 36 is switched by an electromagnetic proportional regulator switching valve 38. The regulator switching valve 38 is connected to the pump line 16 via a pilot line 40. The pilot line 40 is provided with a pressure reducing valve 42 for lowering a pressure of the hydraulic oil in the pump line 16 to a predetermined pressure.

A housing 28c of the bidirectional hydraulic pump 28 is indicated by a dot dash line in FIG. 1. It is assumed that the configuration (for example, a first and second check valves 46 and 48 and the first and second relief valves 50 and 52, which will be described later) disposed in the rectangular region defined by the dot dash line is mounted on the housing 28c of the bidirectional hydraulic pump 28.

Hydraulic Motor 30, First and Second Lines 32, 34

The hydraulic motor 30 is operated by the hydraulic oil discharged from the bidirectional hydraulic pump 28. The hydraulic motor 30 has a first port 30a and a second port 30b. The first port 30a of the hydraulic motor 30 is connected to the first port 28a of the bidirectional hydraulic pump 28 via the first line 32. In addition, the second port 30b of the hydraulic motor 30 is connected to the second port 28b of the bidirectional hydraulic pump 28 via the second line 34.

Charge Line 44

A charge line 44 for supplying hydraulic oil from the open circuit 2a to the closed circuit 2b is provided between the open circuit 2a and the closed circuit 2b. An open circuit 2a side of the charge line 44 is connected to a portion of the return line 10 on the upstream side of the return check valve 12. On the other hand, a closed circuit 2b side of the charge line 44 is connected to the first line 32 via the first check valve 46 and to the second line 34 via the second check valve 48. The closed circuit 2b side of the charge line 44 is connected to the housing 28c of the bidirectional hydraulic pump 28.

First and Second Relief Valves 50, 52

The closed circuit 2b of the first embodiment includes a first relief valve 50 that releases hydraulic oil in the first line 32 to the second line 34 via the second check valve 48, and a second relief valve 52 that releases hydraulic oil in the second line 34 to the first line 32 via the first check valve 46. The set pressures of the first and second relief valves 50 and 52 may be, for example, 30 MPa to 40 MPa.

Further, the hydraulic circuit 2 includes an actuator manipulator 54, a motor manipulator 56, and a controller 58.

Actuator Manipulator 54, Motor Manipulator 56

The actuator manipulator 54 outputs a signal for operating the hydraulic actuator 6. The motor manipulator 56 outputs a signal for operating the hydraulic motor 30. The actuator manipulator 54 and the motor manipulator 56 may be configured to include input devices (for example, a lever operable in a front-rear direction, a joystick operable in a cross direction, a slide switch, a pedal, etc.) that increase the intensity of a signal output as the operation amount increases. Although FIG. 1 illustrates an example in which each of the manipulators 54 and 56 outputs an electric signal, each of the manipulators 54 and 56 may output a hydraulic signal.

Controller 58

The controller 58 executes circuit control on the basis of signals output from the respective manipulators 54 and 56. The controller 58 includes a computer including a processing device and a storage device. Note that, in a case where the signal output from each of the manipulators 54 and 56 is a hydraulic signal, the output hydraulic signal is detected by a pressure sensor (not shown), and the detection result of the pressure sensor is input to the controller 58.

Operation of Hydraulic Circuit 2

Next, the operation of the hydraulic circuit 2 as described above, in particular, the supply of hydraulic oil from the open circuit 2a to the closed circuit 2b will be described. First, the supply of the pilot hydraulic oil to the regulator 36 of the closed circuit 2b will be described, and then the replenishment of the hydraulic oil to the first and second lines 32 and 34 of the closed circuit 2b will be described. In the following description, it is assumed that the directional switching valve 8 is of an electromagnetic proportional type and the directional switching valve 8 is controlled by an electric signal from the controller 58.

Supply of Pilot Hydraulic Oil to Regulator 36

The pilot hydraulic oil can be supplied from the hydraulic pump 4 of the open circuit 2a to the regulator 36 of the bidirectional hydraulic pump 28. As described above, the regulator 36 is connected to the hydraulic pump 4 of the open circuit 2a via the pump line 16 and the pilot line 40. In addition, while the drive source 18 is in operation, hydraulic oil is constantly discharged from the hydraulic pump 4 to the pump line 16. Therefore, in the first embodiment, the pilot hydraulic oil can be supplied to the regulator 36 of the closed circuit 2b even without the charge pump.

However, the pilot hydraulic oil is actually supplied to the regulator 36 of the bidirectional hydraulic pump 28 when the motor manipulator 56 is operated. When the motor manipulator 56 is operated, a signal is output from the motor manipulator 56 in accordance with the operation amount. Then, the controller 58 opens the regulator switching valve 38 and adjusts an opening degree of the regulator switching valve 38 in response to the signal output from the motor manipulator 56. Therefore, the hydraulic oil discharged from the hydraulic pump 4 to the pump line 16 becomes pilot hydraulic oil reduced to a predetermined pressure by the pressure reducing valve 42 of the pilot line 40, and is supplied to the regulator 36. Accordingly, the hydraulic oil is discharged from the first port 28a or the second port 28b of the bidirectional hydraulic pump 28 in accordance with an operation direction of the motor manipulator 56, and the hydraulic oil in an amount corresponding to the operation amount of the motor manipulator 56 is discharged from the bidirectional hydraulic pump 28. As a result, the hydraulic motor 30 rotates in a rotation direction corresponding to the operation direction of the motor manipulator 56, and the hydraulic motor 30 rotates at a rotation speed corresponding to the operation amount of the motor manipulator 56.

On the other hand, when the motor manipulator 56 is not operated, the pilot hydraulic oil is not supplied to the regulator 36. When the motor manipulator 56 is not operated, no signal is output from the motor manipulator 56. In this case, since the controller 58 positions the regulator switching valve 38 at a closed position and blocks the pilot line 40 by the regulator switching valve 38, the pilot hydraulic oil is not supplied to the regulator 36. As a result, the hydraulic oil is not discharged from the bidirectional hydraulic pump 28, and the hydraulic motor 30 is not operated.

Replenishment of Hydraulic Oil to First and Second Lines 32, 34

Next, replenishment of the hydraulic oil to the first and second lines 32 and 34 of the closed circuit 2b will be described.

In the hydraulic circuit 2, when the actuator manipulator 54 is operated, the hydraulic actuator 6 is operated. When the actuator manipulator 54 is operated, a signal is output from the actuator manipulator 54 in accordance with the operation amount. Then, the controller 58 adjusts the discharge amount of the hydraulic pump 4 and an opening degree of the bypass valve 26 in accordance with the signal output from the actuator manipulator 54, thereby increasing a pressure of the pump line 16. In addition, the controller 58 opens the directional switching valve 8 and adjusts an opening degree of the directional switching valve 8 in accordance with the signal output from the actuator manipulator 54. Thus, the hydraulic oil is supplied from the hydraulic pump 4 to the hydraulic actuator 6 via the pump line 16, and the hydraulic oil is returned from the hydraulic actuator 6 to the hydraulic oil tank 14 via the return line 10. As a result, the hydraulic actuator 6 is operated.

When the hydraulic actuator 6 is operated, the hydraulic oil is discharged from the hydraulic actuator 6 to the return line 10, so that a back pressure is generated in the return line 10 by the return check valve 12. Thus, a pressure of a predetermined value or more also acts on the charge line 44 branching and extending from the return line 10. As a result, the hydraulic oil can be replenished to the first line 32 from the charge line 44 via the first check valve 46, or the hydraulic oil can be replenished to the second line 34 from the charge line 44 via the second check valve 48. Therefore, in the first embodiment, even without the charge pump, the hydraulic oil can be supplied from the open circuit 2a to the closed circuit 2b via the charge line 44.

On the other hand, when the actuator manipulator 54 is not operated, the hydraulic actuator 6 is not operated, and the hydraulic oil is not discharged from the hydraulic actuator 6 to the return line 10. When the actuator manipulator 54 is not operated, no signal is output from the actuator manipulator 54. In this case, the controller 58 positions the directional switching valve 8 at the closed position. Therefore, the hydraulic oil is not supplied from the pump line 16 to the hydraulic actuator 6, and the hydraulic oil is not discharged from the hydraulic actuator 6 to the return line 10.

However, even when the hydraulic oil is not discharged from the hydraulic actuator 6 to the return line 10, the hydraulic oil is sent to the return line 10. When the actuator manipulator 54 is not operated, the controller 58 adjusts the discharge amount of the hydraulic pump 4 to a relatively small standby flow rate and adjusts the opening degree of the bypass valve 26 to a predetermined opening degree that is not fully closed. Accordingly, the pressure of the pump line 16 is maintained at a predetermined standby pressure (for example, 3 MPa to 4 MPa). Further, the hydraulic oil discharged from the hydraulic pump 4 to the pump line 16 is sent to the return line 10 through the bypass line 24.

As a result, since a pressure equal to or more than a predetermined value also acts on the charge line 44 branching and extending from the return line 10, the hydraulic oil can be replenished from the charge line 44 to the first line 32 or the second line 34. Therefore, in the first embodiment, even when the hydraulic oil is not discharged from the hydraulic actuator 6 to the return line 10, the hydraulic oil can be supplied from the open circuit 2a to the closed circuit 2b via the charge line 44.

Adjustment of Pressure on the Return Line 10

It is desirable that the controller 58 increases the discharge amount of the hydraulic pump 4 when a pressure of the return line 10 detected by the pressure sensor 22 is lower than a required pressure. This is because, depending on the operating conditions of the construction machine, the pressure of the return line 10 may not rise to a value (the required pressure) necessary for replenishing the hydraulic oil to the closed circuit 2b.

The discharge amount (the standby flow rate) of the hydraulic pump 4 when the hydraulic actuator 6 is not operated is smaller than the discharge amount of the hydraulic pump 4 when the hydraulic actuator 6 is operated in order to suppress energy consumption. That is, a flow rate of the return line 10 when the hydraulic actuator 6 is not operated is smaller than the flow rate of the return line 10 when the hydraulic actuator 6 is operated. Therefore, the pressure of the return line 10 when the hydraulic actuator 6 is not operated becomes smaller than the pressure of the return line 10 when the hydraulic actuator 6 is operated. As a result, depending on the operating conditions of the construction machine, the pressure of the return line 10 when the hydraulic actuator 6 is not operated may not rise to the required pressure. However, even when the hydraulic actuator 6 is operating, there is a possibility that the pressure of the return line 10 does not rise to the required pressure depending on the operating conditions of the construction machine.

Therefore, it is desirable for the controller 58 to increase the discharge amount of the hydraulic pump 4 to raise the pressure of the return line 10 to the required pressure when the pressure of the return line 10 detected by the pressure sensor 22 is lower than the required pressure regardless of whether the hydraulic actuator 6 is operated. Accordingly, the hydraulic oil can be supplied to the closed circuit 2b regardless of the operating conditions of the construction machine.

Regarding the "required pressure", it is preferable that the controller 58 sets the required pressure based on the operation amount of the motor manipulator 56.

When the motor manipulator 56 is returned to a neutral position (non-operation position) after the motor manipulator 56 is operated and the hydraulic motor 30 is operated, the supply of hydraulic oil from the bidirectional hydraulic pump 28 to the hydraulic motor 30 is blocked. When the motor manipulator 56 is returned to the neutral position, since the signal from the motor manipulator 56 is interrupted, the controller 58 stops the discharge of the hydraulic oil from the bidirectional hydraulic pump 28 via the regulator switching valve 38. Therefore, the supply of the hydraulic oil from the bidirectional hydraulic pump 28 to the hydraulic motor 30 is cut off.

However, even if the supply of the hydraulic oil to the hydraulic motor 30 is cut off, the operation of the hydraulic motor 30 may continue, and in this case, cavitation may occur. Even if the supply of the hydraulic oil to the hydraulic motor 30 is cut off, the operation of the hydraulic motor 30 may continue due to inertia of an object to be operated (for example, an upper revolving body rotated by a hydraulic-type revolving motor in a hydraulic excavator) operated by the hydraulic motor 30. The operation of the hydraulic motor 30 in this case acts as a pump. That is, the hydraulic motor 30 discharges the hydraulic oil sucked from one of the first and second ports 30a and 30b from the other of the first and second ports 30a and 30b. Therefore, cavitation may occur in the first line 32 or the second line 34 on the side where the hydraulic oil is sucked.

In order to prevent the occurrence of cavitation, it is necessary to apply a required pressure to the return line 10.

The required pressure varies depending on the inertial force of the object to be operated. That is, the larger the inertial force of the object to be operated, the larger the required pressure, and the smaller the inertial force of the object to be operated, the smaller the required pressure. The inertial force of the object to be operated depends on the rotation speed of the hydraulic motor 30 immediately before stopping. The rotation speed of the hydraulic motor 30 immediately before stopping depends on the amount of hydraulic oil supplied from the bidirectional hydraulic pump 28 to the hydraulic motor 30. Then, the amount of the hydraulic oil supplied from the bidirectional hydraulic pump 28 to the hydraulic motor 30 is controlled by the controller 58 in accordance with the operation amount of the motor manipulator 56. Therefore, it is preferable that the controller 58 sets the required pressure based on the operation amount of the motor manipulator 56.

Figure 2:
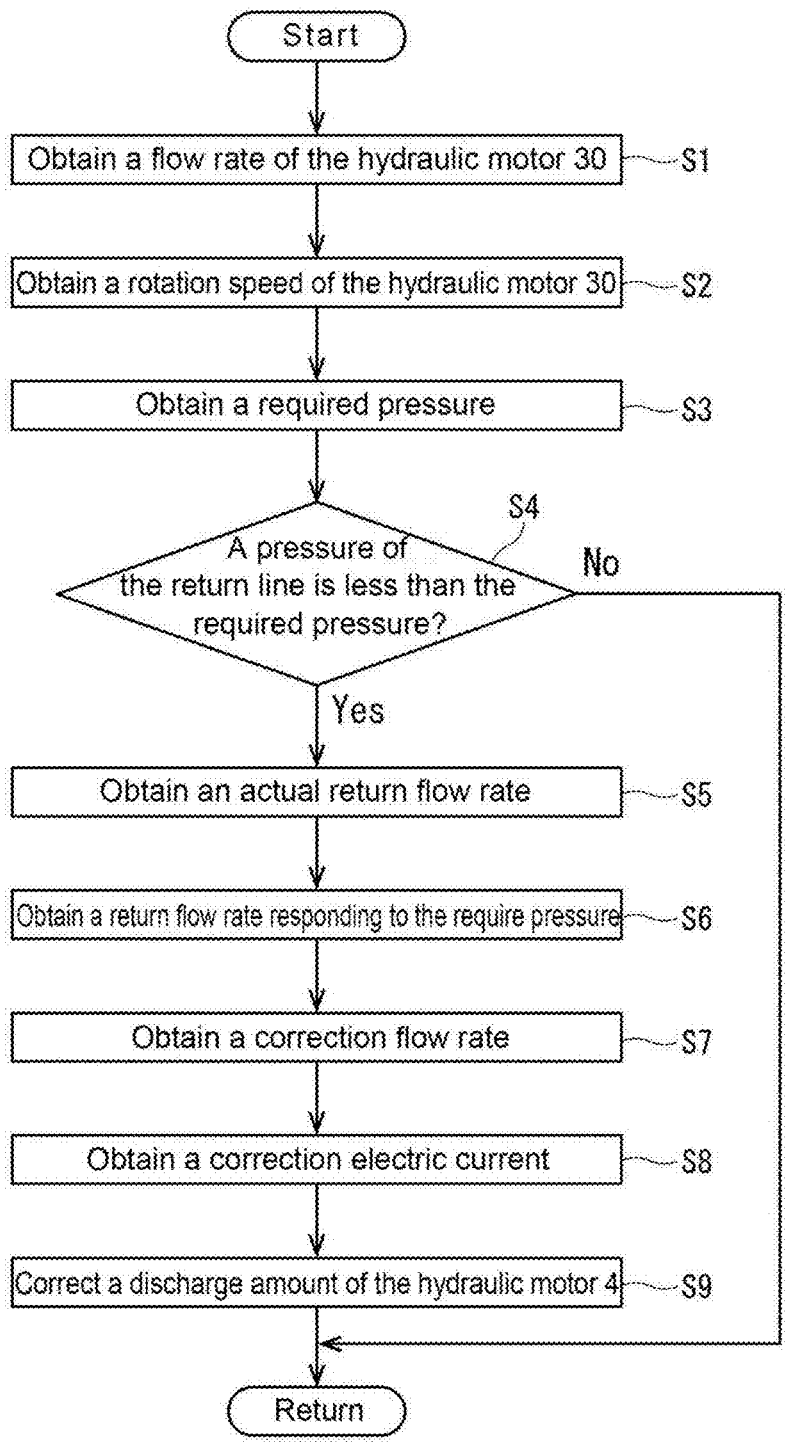
FIG. 2 is a flowchart of control executed by a controller shown in FIG. 1.

Hereinafter, the control executed by the controller 58 to apply a required pressure to the return line 10 will be described with reference to FIG. 2.

Step S1

First, the controller 58 executes step S1 of obtaining an amount of hydraulic oil supplied from the bidirectional hydraulic pump 28 to the hydraulic motor 30 (a flow rate of the hydraulic motor 30) on the basis of a signal output from the motor manipulator 56 in accordance with the operation amount of the motor manipulator 56. A first map indicating a relationship between the operation amount of the motor manipulator 56 and the flow rate of the hydraulic motor 30 is registered in advance in the controller 58. Therefore, the controller 58 refers to the first map and obtains the flow rate of the hydraulic motor 30 from the signal output from the motor manipulator 56.

Step S2

After executing step S1, the controller 58 executes step S2 of obtaining the rotation speed of the hydraulic motor 30 from the flow rate of the hydraulic motor 30 obtained in step S1. A second map indicating a relationship between the flow rate of the hydraulic motor 30 and the rotation speed of the hydraulic motor 30 is registered in advance in the controller 58. Therefore, the controller 58 refers to the second map and obtains the rotation speed of the hydraulic motor 30 from the flow rate of the hydraulic motor 30.

Step S3

After executing step S2, the controller 58 executes step S3 of obtaining the required pressure to be applied to the return line 10 from the rotation speed of the hydraulic motor 30 obtained in step S2. A third map indicating a relationship between the rotation speed of the hydraulic motor 30 and the required pressure to be applied to the return line 10 is registered in advance in the controller 58. The third map takes into account the rotation speed of the object to be operated by the hydraulic motor 30, the mass of the object to be operated, and the like. Then, the controller 58 refers to the third map and obtains the required pressure to be applied to the return line 10 based on the rotation speed of the hydraulic motor 30.

Step S4

After executing step S3, the controller 58 executes step S4 of determining whether a pressure of the return line 10 is smaller than the required pressure. The pressure of the return line 10 is input to the controller 58 as a detection result of the pressure sensor 22. The required pressure is the pressure obtained in step S3. Then, when the pressure of the return line 10 is smaller than the required pressure (when the determination result of step S4 is Yes), the process proceeds to step S5. On the other hand, when the pressure of the return line 10 is greater than the required pressure (when the determination result of step S4 is No), the process returns to step S1.

Step S5

When the process proceeds from step S4 to step S5, the controller 58 obtains an actual return flow rate from the detection result of the pressure sensor 22. As described above, the return line 10 is provided with the return check valve 12 that generates the back pressure, and the back pressure generated by the return check valve 12 increases as the amount of the hydraulic oil passing through the return line 10 increases. A fourth map created on the basis of such characteristics of the return check valve 12 is registered in advance in the controller 58. The fourth map is a map showing a relationship between a flow rate passing through the return line 10 (a return flow rate) and the back pressure generated in the return line 10 by the return check valve 12. Then, the controller 58 refers to the fourth map and obtains the actual return flow rate from the detection result of the pressure sensor 22 (an actual pressure of the return line 10).

Step S6

After executing step S5, the controller 58 refers to the fourth map and executes step S6 of obtaining the return flow rate corresponding to the required pressure obtained in step S3. Note that step S6 may be executed before step S5, or step S5 and step S6 may be executed in parallel.

Step S7

After executing step S6, the controller 58 obtains a Correction flow rate using a following Equation 1 from the actual return flow rate (a flow rate before correction) obtained in step S5 and the return flow rate corresponding to the required pressure obtained in step S6.

$$\text{Correction flow rate} = \text{Return flow rate corresponding to required pressure} - \text{Actual return flow rate} \qquad \text{Equation 1}$$

Step S8

After executing step S7, the controller 58 executes step S8 of obtaining a correction electric current from the correction flow rate obtained in step S7. A fifth map indicating a relationship between an electric current sent to the hydraulic pump 4 and a discharge amount of the hydraulic pump 4 is registered in advance in the controller 58. Then, the controller 58 refers to the fifth map and obtains the correction electric current corresponding to the correction flow rate.

Step S9

After executing step S8, the controller 58 executes step S9 of correcting the discharge amount of the hydraulic pump 4 on the basis of the correction electric current obtained in step S8. Specifically, an electric current obtained by summing the correction electric current obtained in step S8 and the electric current sent to the hydraulic pump 4 before the correction is sent to the hydraulic pump 4. Thus, a flow rate obtained by adding the correction flow rate to the discharge amount of the hydraulic pump 4 before correction is discharged from the hydraulic pump 4. As a result, the pressure of the return line 10 rises to the required pressure, and the closed circuit 2b can be replenished with a required amount of hydraulic oil through the charge line 44, so that the occurrence of cavitation can be prevented. When correcting the discharge amount of the hydraulic pump 4, an adjustment electric current serving as a safety margin may be added to the electric current before correction together with the correction electric current.

In this way, it is desirable that the controller 58 sets the required pressure based on the operation amount of the motor manipulator 56, and increases the discharge amount of the hydraulic pump 4 to raise the pressure of the return line 10 to the required pressure when the pressure of the return line 10 detected by the pressure sensor 22 is lower than the required pressure.

Alternatively, the controller 58 may set the required pressure on the basis of the rotation speed of the object to be operated which is rotated by the hydraulic motor 30 of the closed circuit 2b. The rotation speed of the object to be operated is related to the inertial force of the object to be operated, and the inertial force of the object to be operated is related to the required pressure to be applied to the return line 10. That is, the required pressure depends on the rotation speed of the object to be operated. Therefore, the controller 58 can set the required pressure based on the rotation speed of the object to be operated.

When the controller 58 sets the required pressure based on the rotation speed of the object to be operated, a rotation speed detection means for detecting the rotation speed of the object to be operated (for example, a rotational angle sensor for detecting a rotational angle of the object to be operated) is provided, and a detection result of the rotation speed detection means is sent to the controller 58. In addition, a sixth map indicating a relationship between the rotation speed of the object to be operated and the required pressure is registered in advance in the controller 58. Then, the controller 58 sets the required pressure from the rotation speed of the object to be operated with reference to the sixth map, and when the pressure of the return line 10 detected by the pressure sensor 22 is lower than the required pressure, the controller 58 can increase the discharge amount of the hydraulic pump 4 to raise the pressure of the return line 10 to the required pressure.

As described above, in the first embodiment, the hydraulic oil can be replenished to the first line 32 from the charge line 44 via the first check valve 46, or the hydraulic oil can be replenished to the second line 34 from the charge line 44 via the second check valve 48. That is, in the first embodiment, even without the charge pump, the hydraulic oil can be supplied from the open circuit 2a to the closed circuit 2b via the charge line 44.

Therefore, in the first embodiment, since the charge pump, the external filter to be attached to the charge pump, and piping components for incorporating the charge pump and the external filter into the hydraulic circuit 2 are not required, an increase in the cost of the hydraulic circuit 2 is not caused. In addition, maintenance work is facilitated by the reduction in the number of components. Furthermore, in the first embodiment, since the hydraulic oil in the return line, which does not use the horsepower of the drive source, is used to replenish the hydraulic oil to the closed circuit 2b, the horsepower consumption of the drive source can be reduced. That is, energy consumption can be suppressed.

Second Embodiment

Next, a second embodiment of a hydraulic circuit for a construction machine according to the present invention will be described with reference to FIG. 3. In the second embodiment, constituent elements similar to those of the first embodiment are denoted by the same reference numerals as those of the first embodiment, and description thereof will be omitted.

Figure 3:
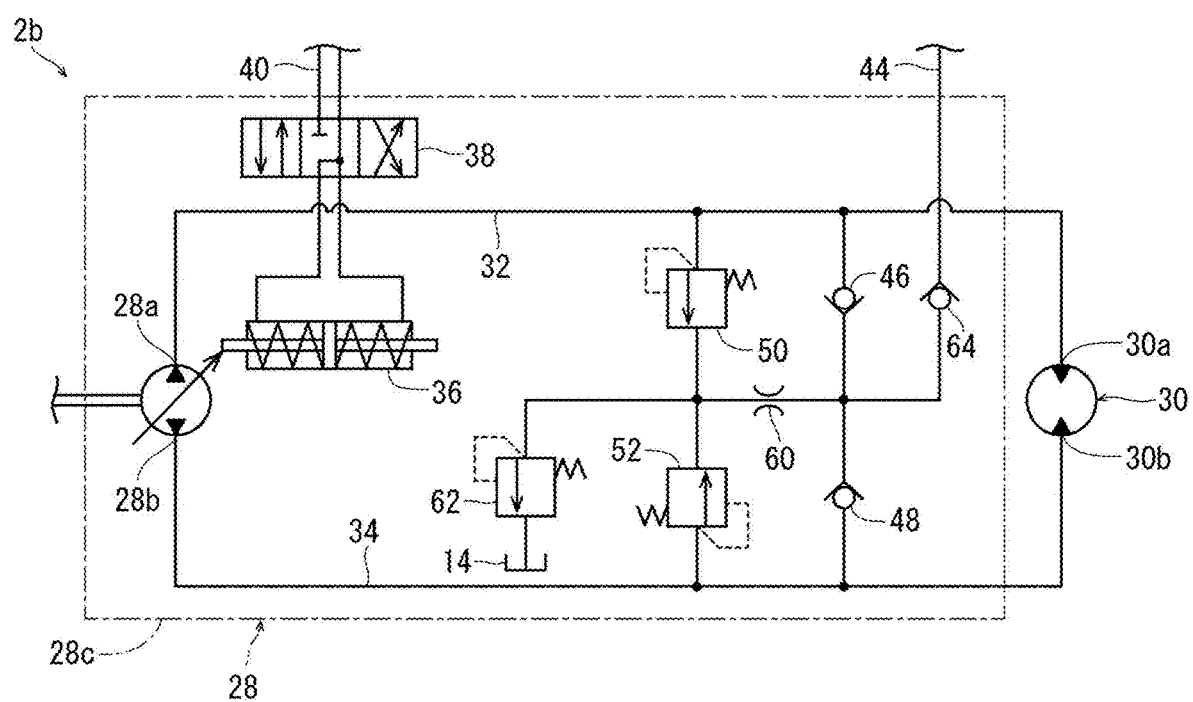
FIG. 3 is a circuit diagram of a hydraulic circuit for a construction machine according to the second embodiment of the present invention.

As shown in FIG. 3, a throttle 60 is disposed between the first relief valve 50 and the second check valve 48 and between the second relief valve 52 and the first check valve 46. Further, a third relief valve 62 is disposed between the first relief valve 50 and the hydraulic oil tank 14 and between the second relief valve 52 and the hydraulic oil tank 14. A set pressure of the third relief valve 62 is smaller than the set pressure of the first relief valve 50 and smaller than the set pressure of the second relief valve 52. In addition, the charge line 44 is provided with a third check valve 64 that allows the flow from the open circuit 2a to the closed circuit 2b and blocks the flow from the closed circuit 2b to the open circuit 2a.

In the second embodiment, when the pressure of the first line 32 exceeds the set pressure of the first relief valve 50, the hydraulic oil in the first line 32 passes through the first relief valve 50, flows into the second line 34 via the throttle 60 and the second check valve 48, and flows into the hydraulic oil tank 14 via the third relief valve 62. Similarly, when the pressure of the second line 34 exceeds the set pressure of the second relief valve 52, the hydraulic oil in the second line 34 passes through the second relief valve 52, flows into the first line 32 via the throttle 60 and the first check valve 46, and flows into the hydraulic oil tank 14 via the third relief valve 62.

Thus, in the second embodiment, a part of the hydraulic oil released from the first and second lines 32 and 34 flows into the hydraulic oil tank 14. Therefore, in the second embodiment, the amount of the hydraulic oil replenished from the open circuit 2a to the closed circuit 2b is increased. That is, in the second embodiment, the hydraulic oil in the closed circuit 2b is easily replaced. In general, the temperature of the hydraulic oil is more likely to rise in the closed circuit than in the open circuit, but in the second embodiment, the hydraulic oil in the closed circuit 2b is easily replaced, so that an excessive rise in the temperature of the hydraulic oil is suppressed. Also in the second embodiment, similarly to the first embodiment, the hydraulic oil can be supplied from the open circuit 2a to the closed circuit 2b via the charge line 44 without the charge pump.

Third Embodiment

Figure 4:
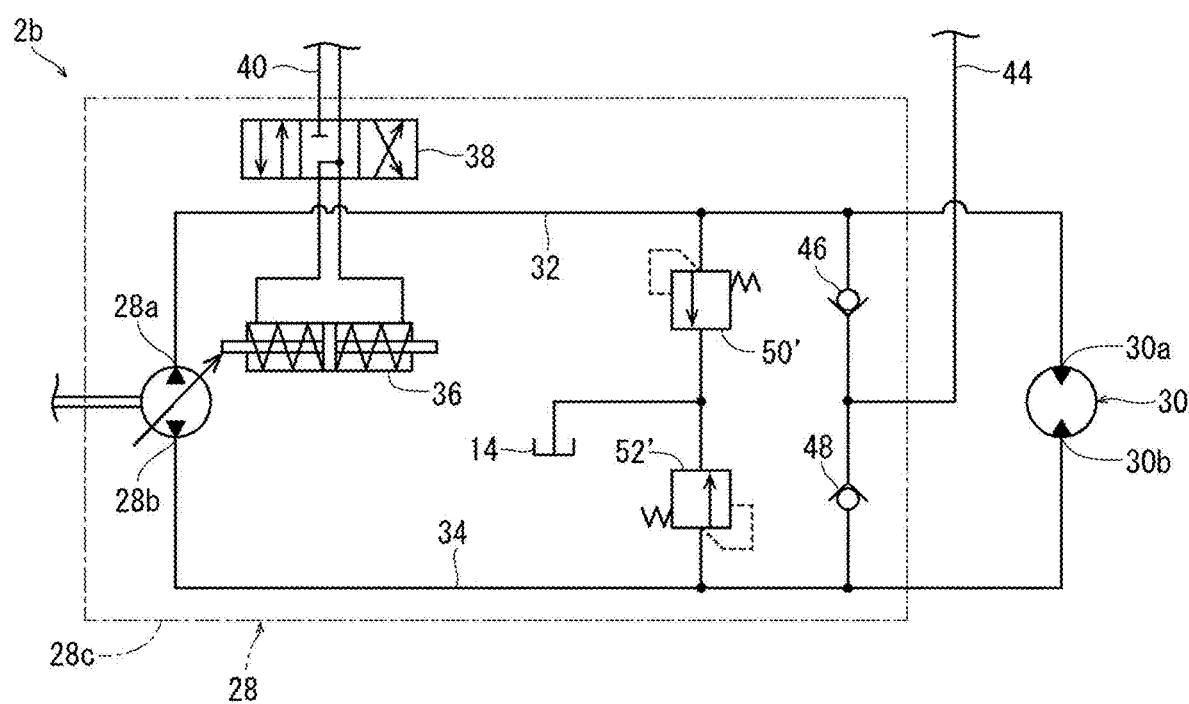
FIG. 4 is a circuit diagram of a hydraulic circuit for a construction machine according to the third embodiment of the present invention.

Next, a third embodiment of a hydraulic circuit of a construction machine according to the present invention will be described with reference to FIG. 4. In the third embodiment, components similar to those of the first and second embodiments are denoted by the same reference numerals as those in the first and second embodiments, and the description thereof will be omitted.

The closed circuit 2b of the third embodiment includes a first relief valve 50' for releasing the hydraulic oil in the first line 32 to the hydraulic oil tank 14, and a second relief valve 52' for releasing the hydraulic oil of the second line 34 to the hydraulic oil tank 14. As can be understood with reference to FIG. 4, the first relief valve 50' of the third embodiment is not connected to the second check valve 48, unlike the first relief valves 50 of the first and second embodiments. In addition, unlike the second relief valves 52 of the first and second embodiments, the second relief valve 52' of the third embodiment is not connected to the first check valve 46.

In the third embodiment, all of the hydraulic oil that has passed through the first and second relief valves 50' and 52' flows into the hydraulic oil tank 14. Therefore, in the third embodiment, since the hydraulic oil in the closed circuit 2b is more easily replaced than in the second embodiment, the rise of the temperature of the hydraulic oil is further suppressed. Also in the third embodiment, similarly to the first and second embodiments, the hydraulic oil can be supplied from the open circuit 2a to the closed circuit 2b via the charge line 44 without the charge pump.

Fourth Embodiment

Figure 5:
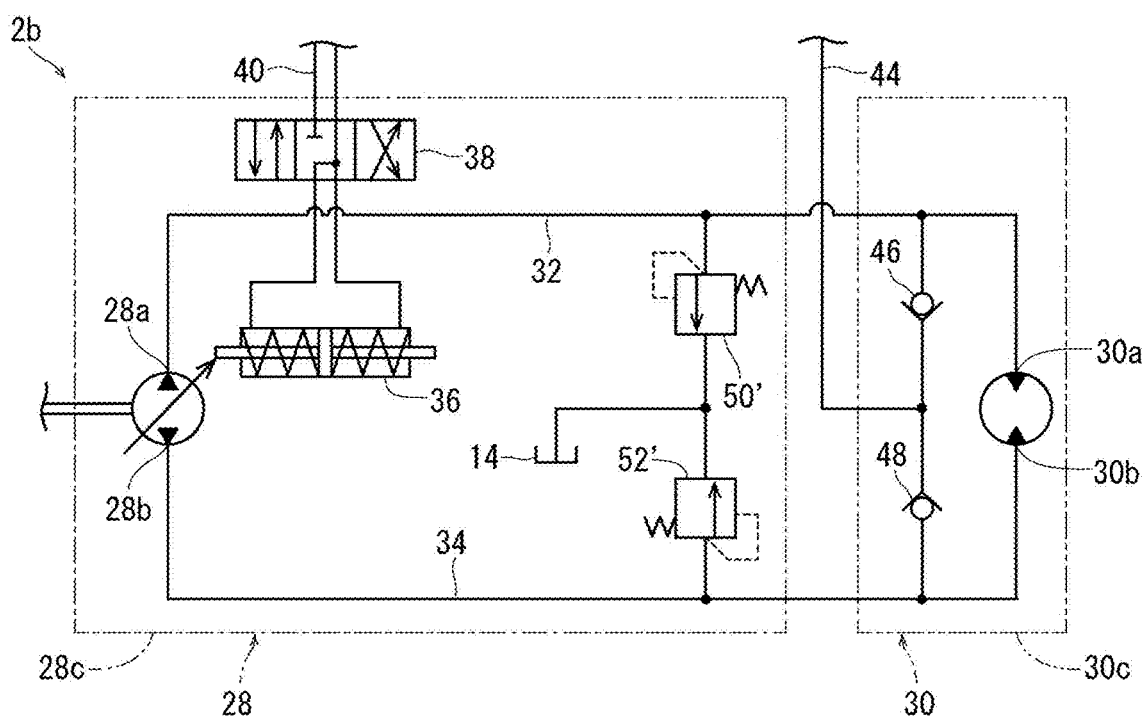
FIG. 5 is a circuit diagram of a hydraulic circuit for a construction machine according to the fourth embodiment of the present invention.

Finally, a fourth embodiment of the hydraulic circuit of the construction machine according to the present invention will be described with reference to FIG. 5. In the fourth embodiment, components similar to those of the first to third embodiments are denoted by the same reference numerals as those of the first to third embodiments, and description thereof will be omitted.

In the fourth embodiment, the first and second check valves 46 and 48 are mounted on the housing 30c of the hydraulic motor 30, and the charge line 44 is also connected to the housing 30c of the hydraulic motor 30.

In the fourth embodiment, for example, in a case where the hydraulic circuit 2 is mounted on the hydraulic excavator and the hydraulic motor 30 of the closed circuit 2b is a swivel motor that swivels an upper swivel body of the hydraulic excavator, the layout of the charge line 44 connecting the open circuit 2a and the closed circuit 2b is facilitated. In general, in a hydraulic excavator, a swivel motor is disposed closer to the directional switching valve than the hydraulic pump. Therefore, connecting the charge line 44 to the housing 30c of the hydraulic motor 30 (swivel motor) as in the fourth embodiment is easier in layout than connecting the charge line 44 to the housing 28c of the bidirectional hydraulic pump 28 as in the third embodiment. Also in the fourth embodiment, similarly to the first to third embodiments, the hydraulic oil can be supplied from the open circuit 2a to the closed circuit 2b via the charge line 44 without the charge pump

What is claimed is:

1. A hydraulic circuit for a construction machine comprising an open circuit and a closed circuit,
    wherein the open circuit includes:
    a variable-volume hydraulic pump configured to discharge hydraulic oil sucked from a hydraulic oil tank;
    a hydraulic actuator operated by the hydraulic oil discharged from the hydraulic pump;
    a directional switching valve configured to switch a flow direction of the hydraulic oil from the hydraulic pump to the hydraulic actuator;
    a pump line connecting the hydraulic pump and the directional switching valve;
    a return line connecting the directional switching valve and the hydraulic oil tank;
    a return check valve provided in the return line;
    a bypass line connecting the pump line and the return line;
    an electromagnetic proportional bypass valve provided in the bypass line, and
    the closed circuit includes:
    a variable-volume bidirectional hydraulic pump having a first port and a second port;
    a hydraulic motor operated by hydraulic oil discharged from the bidirectional hydraulic pump;
    a first line connecting the first port of the bidirectional hydraulic pump and the hydraulic motor;
    a second line connecting the second port of the bidirectional hydraulic pump and the hydraulic motor, and
    wherein a charge line is provided between the open circuit and the closed circuit that connects a portion of the return line on an upstream side of the return check valve to the first line via a first check valve, and connects a portion of the return line on an upstream side of the return check valve to the second line via a second check valve.

2. The hydraulic circuit for a construction machine of claim 1, wherein the closed circuit includes a first relief valve that releases hydraulic oil in the first line to the second line via the second check valve, and a second relief valve that releases hydraulic oil in the second line to the first line via the first check valve.

3. The hydraulic circuit for a construction machine of claim 2, wherein a throttle is disposed between the first relief valve and the second check valve and between the second relief valve and the first check valve, and
    a third relief valve is disposed between the first relief valve and the hydraulic oil tank and between the second relief valve and the hydraulic oil tank,
    wherein a set pressure of the third relief valve is smaller than a set pressure of the first relief valve and smaller than a set pressure of the second relief valve.

4. The hydraulic circuit for a construction machine of claim 1, wherein the closed circuit includes:
    a first relief valve that releases hydraulic oil in the first line to the hydraulic oil tank, and
    a second relief valve that releases hydraulic oil in the second line to the hydraulic oil tank.

5. The hydraulic circuit for a construction machine of claim 1, wherein the first check valve and the second check valve are mounted on a housing of the bidirectional hydraulic pump, and the charge line is connected to the housing.

6. The hydraulic circuit for a construction machine of claim 1, wherein the first check valve and the second check valve are mounted on a housing of the hydraulic motor, and the charge line is connected to the housing.

7. The hydraulic circuit for a construction machine of claim 1, wherein the hydraulic circuit comprises:
    a pressure sensor that detects a pressure on the upstream side of the return check valve in the return line, and
    a controller that increases a discharge amount of the hydraulic pump when the pressure detected by the pressure sensor is lower than a required pressure.

8. The hydraulic circuit for a construction machine of claim 7, wherein the controller sets the required pressure based on an operation amount of a motor manipulator that outputs a signal for operating the hydraulic motor of the closed circuit.

9. The hydraulic circuit for a construction machine of claim 7, wherein the controller sets the required pressure based on a rotation speed of an object to be operated which is operated by the hydraulic motor of the closed circuit.

10. The hydraulic circuit for a construction machine of claim 1, wherein the hydraulic circuit comprises:
    a regulator that controls a discharge amount and a discharge direction of the bidirectional hydraulic pump,
    an electromagnetic proportional regulator switching valve that switches a flow direction of pilot hydraulic oil to the regulator,
    a pilot line branching from the pump line and extending to the regulator switching valve, and
    a pressure reducing valve provided in the pilot line.

* * * * *